(12) United States Patent
Xue

(10) Patent No.: US 10,901,587 B2
(45) Date of Patent: *Jan. 26, 2021

(54) WIDGET AREA ADJUSTMENT METHOD AND APPARATUS

(71) Applicant: Huawei Technologies Co., Ltd., Shenzhen (CN)

(72) Inventor: Rong Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,439

(22) Filed: Jun. 5, 2019

(65) Prior Publication Data
US 2019/0286310 A1 Sep. 19, 2019

Related U.S. Application Data

(63) Continuation of application No. 14/901,867, filed as application No. PCT/CN2014/073105 on Mar. 10, 2014, now Pat. No. 10,331,317.

(30) Foreign Application Priority Data

Aug. 20, 2013 (CN) .......................... 2013 1 0363344

(51) Int. Cl.
*G06F 3/0484* (2013.01)
*G06F 3/0481* (2013.01)
*G06F 3/0488* (2013.01)

(52) U.S. Cl.
CPC ........ *G06F 3/04845* (2013.01); *G06F 3/0484* (2013.01); *G06F 3/04817* (2013.01); *G06F 3/04883* (2013.01)

(58) Field of Classification Search
CPC ............. G06F 3/04845; G06F 3/04817; G06F 3/0484; G06F 3/04883
See application file for complete search history.

(56) References Cited

U.S. PATENT DOCUMENTS

| 8,332,775 B2 | 12/2012 | Cantu-Paz |
| 2002/0122066 A1 | 9/2002 | Bates et al. |

(Continued)

FOREIGN PATENT DOCUMENTS

| CN | 101853158 A | 10/2010 |
| CN | 102520865 A | 6/2012 |

(Continued)

OTHER PUBLICATIONS

Partial English Translation and Abstract of Chinese Patent Application No. CN102789355, Jan. 14, 2016, 13 pages.

(Continued)

*Primary Examiner* — Tadesse Hailu
(74) *Attorney, Agent, or Firm* — Conley Rose, P.C.

(57) ABSTRACT

A widget area adjustment method and apparatus which are related to the field of Internet application technologies, where the method includes entering a widget edit mode according to a startup instruction triggered by a user; acquiring a sliding track triggered by the user in a widget that has entered the edit mode, where the sliding track is used to adjust a widget area; and determining the widget area according to an end position of the widget and a position of a screen border, where the end position of the widget is determined by an offset of the sliding track. The method and apparatus may be applied to a process of electronic device usage.

20 Claims, 11 Drawing Sheets

(56) References Cited

U.S. PATENT DOCUMENTS

| | | | |
|---|---|---|---|
| 2003/0085998 | A1 | 5/2003 | Ramirez-Diaz et al. |
| 2003/0107604 | A1 | 6/2003 | Cording |
| 2005/0172239 | A1* | 8/2005 | Liu .................. G06F 3/0481 |
| | | | 715/763 |
| 2008/0129648 | A1 | 6/2008 | Hagiwara et al. |
| 2008/0301582 | A1 | 12/2008 | Gluck |
| 2009/0259958 | A1 | 10/2009 | Ban |
| 2012/0054663 | A1 | 3/2012 | Baek et al. |
| 2012/0159386 | A1 | 6/2012 | Kang et al. |
| 2012/0169774 | A1 | 7/2012 | Yu |
| 2012/0246586 | A1 | 9/2012 | Heo et al. |
| 2013/0021381 | A1 | 1/2013 | Zhang et al. |
| 2013/0080953 | A1 | 3/2013 | Rodriguez |
| 2013/0100042 | A1 | 4/2013 | Kincaid |
| 2013/0139109 | A1 | 5/2013 | Kim et al. |
| 2013/0167080 | A1 | 6/2013 | Ari et al. |
| 2013/0167083 | A1* | 6/2013 | Jung ................ G06F 3/04817 |
| | | | 715/810 |
| 2013/0311920 | A1* | 11/2013 | Koo ................. G06F 3/04817 |
| | | | 715/765 |
| 2014/0101603 | A1 | 4/2014 | Kawaguchi |
| 2014/0108936 | A1 | 4/2014 | Khosropour et al. |
| 2014/0137036 | A1 | 5/2014 | Han |
| 2014/0250392 | A1 | 9/2014 | Riggins et al. |
| 2015/0106752 | A1* | 4/2015 | Yang ................ G06F 3/04817 |
| | | | 715/763 |
| 2015/0113428 | A1 | 4/2015 | Liu |
| 2015/0205507 | A1 | 7/2015 | Chen |

FOREIGN PATENT DOCUMENTS

| | | |
|---|---|---|
| CN | 102789355 A | 11/2012 |
| CN | 103455245 A | 12/2013 |
| EP | 1843322 A1 | 10/2007 |
| EP | 2503440 A2 | 9/2012 |
| JP | 2001296946 A | 10/2001 |
| JP | 2009151500 A | 7/2009 |
| JP | 2010152868 A | 7/2010 |
| JP | 2010198627 A | 9/2010 |
| JP | 2011180743 A | 9/2011 |
| JP | 2012198893 A | 10/2012 |
| KR | 20100097358 A | 9/2010 |
| KR | 20120079579 A | 7/2012 |
| KR | 20130024524 A | 3/2013 |
| WO | 2006072985 A1 | 7/2006 |

OTHER PUBLICATIONS

Partial English Translation and Abstract of Chinese Patent Application No. CN101853158, May 5, 2016, 13 pages.

Partial English Translation and Abstract of Chinese Patent Application No. CN103455245, Dec. 25, 2015, 3 pages.

Partial English Translation and Abstract of Korean Patent Application No. KR20100097358, Dec. 25, 2015, 4 pages.

Partial English Translation and Abstract of Korean Patent Application No. KR20130024524, Mar. 8, 2013, 22 pages.

Machine Translation and Abstract of Japanese Publication No. JPA2011180743, Sep. 15, 2011, 19 pages.

Machine Translation and Abstract of Japanese Publication No. JPA2012198893, Oct. 18, 2012, 23 pages.

Machine Translation and Abstract of Japanese Publication No. JPA2010198627, Sep. 9, 2010, 12 pages.

Machine Translation and Abstract of Japanese Publication No. JP2001296946, Oct. 26, 2001, 8 pages.

Foreign Communication From a Counterpart Application, PCT Application No. PCT/CN2014/073105, English Translation of International Search Report dated Jun. 3, 2014, 2 pages.

Foreign Communication From a Counterpart Application, PCT Application No. PCT/CN2014/073105, English Translation of Written Opinion dated Jun. 3, 2014, 13 pages.

Foreign Communication From a Counterpart Application, Chinese Application No. 201310363344.4, Chinese Office Action dated Dec. 2, 2015, 9 pages.

Foreign Communication Form a Counterpart Application, European Application No. 14837322.8, Extended European Search Report dated Jun. 22, 2016, 7 pages.

Foreign Communication From a Counterpart Application, Korean Application No. 10-2016-7001814, Korean Office Action dated Jan. 16, 2017, 7 pages.

Foreign Communication From a Counterpart Application, Korean Application No. 10-2016-7001814, English Translation of Korean Office Action dated Jan. 16, 2017, 5 pages.

Foreign Communication From a Counterpart Application, Japanese Application No. 2016-532202, Japanese Office Action dated Feb. 21, 2017, 5 pages.

Foreign Communication From a Counterpart Application, Japanese Application No. 2016-532202, English Translation of Japanese Office Action dated Feb. 21, 2017, 6 pages.

Foreign Communication From a Counterpart Application, Japanese Application No. 2016-532202, Japanese Office Action dated Jul. 25, 2017, 5 pages.

Foreign Communication From a Counterpart Application, Japanese Application No. 2016-532202, English Translation of Japanese Office Action dated Jul. 25, 2017, 5 pages.

Foreign Communication From a Counterpart Application, Korean Application No. 10-2016-7001814, Korean Office Action dated Jul. 31, 2017, 6 pages.

Foreign Communication From a Counterpart Application, Korean Application No. 10-2016-7001814, English Translation of Korean Office Action dated Jul. 31, 2017, 4 pages.

Foreign Communication From a Counterpart Application, Japanese Application No. 2016-532202, Japanese Office Action dated Feb. 4, 2019, 12 pages.

Foreign Communication From a Counterpart Application, Japanese Application No. 2016-532202, English Translation of Japanese Office Action dated Feb. 4, 2019, 13 pages.

* cited by examiner

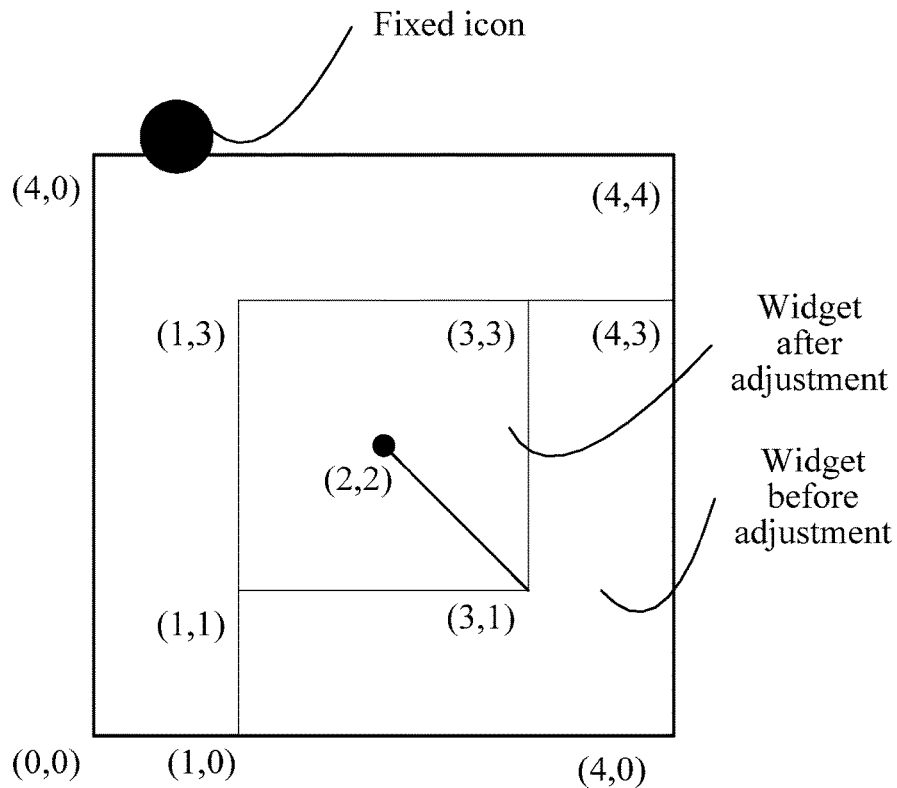

FIG. 8

```
┌─────────────────────────────────────────────────────────────┐
│ Receive a fix instruction triggered by a user at a fixed    │ ─ 901
│ point, where the fixed point is any vertex of a widget, and │
│ coordinates of the fixed point are (x₀,y₀)                  │
└─────────────────────────────────────────────────────────────┘
                              │
                              ▼
┌─────────────────────────────────────────────────────────────┐
│ Acquire coordinates (x₁,y₁) of an end point of a sliding    │ ─ 902
│ track                                                       │
└─────────────────────────────────────────────────────────────┘
                              │
                              ▼
┌─────────────────────────────────────────────────────────────┐
│ Calculate a widget area determined by the coordinates       │ ─ 903
│ (x₁,y₁) of the end point of the sliding track and the       │
│ coordinates (x₀,y₀) of the fixed point                      │
└─────────────────────────────────────────────────────────────┘
```

- 901: Receive a fix instruction triggered by a user at a fixed point, where the fixed point is any vertex of a widget, and coordinates of the fixed point are $(x_0, y_0)$
- 902: Acquire coordinates $(x_1, y_1)$ of an end point of a sliding track
- 903: Calculate a widget area determined by the coordinates $(x_1, y_1)$ of the end point of the sliding track and the coordinates $(x_0, y_0)$ of the fixed point

FIG. 9

WIDGET AREA ADJUSTMENT METHOD AND APPARATUS

CROSS-REFERENCE TO RELATED APPLICATIONS

This application is a continuation of U.S. patent application Ser. No. 14/901,867 filed on Dec. 29, 2015, which is a National Stage of International Application No. PCT/CN2014/073105 filed on Mar. 10, 2014, which claims priority to Chinese Patent Application No. 201310363344.4 filed on Aug. 20, 2013. All of the aforementioned patent applications are hereby incorporated by reference in their entireties.

TECHNICAL FIELD

The present disclosure relates to the field of Internet application technologies, and in particular, to a widget area adjustment method and apparatus.

BACKGROUND

A main screen of an existing device running an ANDROID system is implemented by a process of a launcher application. The launcher application is a core application of the system, is started while the device is started, and is a basis for starting other applications. The launcher application provides a virtual home interface. On the home interface, there are two types of basic content: one type is a widget, and the other type is a shortcut of an application. As a presentation of application information and a carrier of a simple operation, the Widget can display some information inside the application to a user, such as a news title, a mail subject, or a quick reminder; in addition, by means of a simple gesture operation such as tapping or sliding, the widget may trigger start of an application corresponding to the widget, to enter an application interface, or an action that switches presented content, such as switching or paging up/down. However, an area of the widget is limited, and the widget occupies space of the home. Therefore, the ANDROID system provides a function of changing the area size of the widget, such that the user adjusts the size of the widget according to a need of the user, to reach a balance between information display content and occupied home space, meeting a comprehensive requirement of the user on functionality and usability.

In the prior art, the widget area is adjusted in the following manner: after the user touches and holds the widget, the widget enters an edit mode, where the edit mode is used to adjust an area size and a position of the widget. A characteristic of entering the edit mode is that a border is displayed at an edge position of the widget, and a small dot is displayed at a central point position of each side of or each vertex of the border. When the user drags and moves one small dot, a position of a side on which the small dot (which is located at a central point of the side) is located changes accordingly, or positions and lengths of two sides corresponding to the small dot (which is located at the vertex) change accordingly, and then the adjustment of the area size of the widget is implemented.

In a process of implementing the adjustment of the widget area, it has been discovered that the prior art has at least the following problem: in the edit mode, an area of the displayed border is limited, and the user cannot accurately tap the small dot on the border, causing a problem of low operation accuracy. When the user fails to accurately tap the small dot, a move widget instruction is triggered if a touch point is within the border; the widget cannot be adjusted if the touch point is outside the border.

SUMMARY

The present disclosure provides a widget area adjustment method and apparatus, which can solve a problem of low user operation accuracy.

According to a first aspect, the present disclosure provides a widget area adjustment method, including entering a widget edit mode according to a startup instruction triggered by a user; acquiring a sliding track triggered by the user in a widget that has entered the edit mode, where the sliding track is used to adjust a widget area; and determining the widget area according to an end position of the widget and a position of a screen border, where the end position of the widget is determined by an offset of the sliding track.

In a first possible implementation manner of the first aspect, the acquiring a sliding track triggered by the user in a widget that has entered the edit mode includes acquiring the sliding track triggered by the user in an internal region of the widget that has entered the edit mode.

In implementation manners of the first aspect, a second possible implementation manner of the first aspect is further provided, and in the second possible implementation manner of the first aspect, the determining the widget area according to an end position of the widget and a position of a screen border, where the end position of the widget is determined by an offset of the sliding track includes determining a displacement according to a start point and an end point of the sliding track, where the displacement is used to indicate displacements of vertexes of the widget; calculating the end position of the widget according to the displacement and a start position of the widget, where the end position of the widget and the start position of the widget are both indicated by coordinates of the four vertexes of the widget, the start position of the widget is represented by positions of vertexes that are of the widget and corresponding to the start point of the sliding track, and the end position of the widget is represented by positions of vertexes that are of the widget and corresponding to the end point of the sliding track; acquiring coordinates of four vertexes of the screen border; and if a coordinate that exceeds a coordinate range indicated by the coordinates of the four vertexes of the screen border exists in coordinates of the four vertexes of the end position of the widget, calculating an area of an overlap region between the widget and the screen border, where the area of the overlap region is the widget area.

In the implementation manners of the first aspect, a third possible implementation manner of the first aspect is further provided, and in the third possible implementation manner of the first aspect, the entering a widget edit mode according to a startup instruction triggered by a user includes displaying the widget in an activation state according to the startup instruction triggered by the user.

According to a second aspect, the present disclosure provides a widget area adjustment method, including entering a widget edit mode according to a startup instruction triggered by a user; acquiring a sliding track triggered by the user in an internal region of a widget that has entered the edit mode, where the sliding track is used to adjust a widget area; and if a fix instruction triggered by the user at a preset fixed point is received, determining the widget area according to the preset fixed point, a reference point corresponding to the preset fixed point, and displacements corresponding to a start point and an end point of the sliding track, or determining the widget area according to an end point of the sliding track and the preset fixed point.

In a first possible implementation manner of the second aspect, the acquiring a sliding track triggered by the user in a widget that has entered the edit mode includes acquiring the sliding track triggered by the user in an internal region of the widget that has entered the edit mode.

In implementation manners of the second aspect, a second possible implementation manner of the second aspect is further provided, and in the second possible implementation manner of the second aspect, the entering a widget edit mode according to a startup instruction triggered by a user includes displaying the widget in an activation state according to the startup instruction triggered by the user, and displaying a fixed icon at a fixed point of a border of the widget, where the fixed icon is used to indicate whether the widget is fixed.

In the second possible implementation manner of the second aspect, a third possible implementation manner of the second aspect is further provided, and in the third possible implementation manner of the second aspect, the, if a fix instruction triggered by the user on a preset fixed point is received, determining the widget area according to the preset fixed point, a reference point corresponding to the preset fixed point, and displacements corresponding to a start point and an end point of the sliding track includes receiving a fix instruction triggered by the user at a fixed point, where the fixed point is any vertex of the widget, and coordinates of the fixed point are $(x_0, y_0)$; and if the fix instruction is received, acquiring coordinates $(x'_0, y'_0)$ of a reference point that is on the border of the widget and forms a diagonal line with the fixed point; subtracting a horizontal coordinate of the start point of the sliding track from a horizontal coordinate of the end point of the sliding track, to obtain a lateral displacement dx; subtracting a vertical coordinate of the start point of the sliding track from a vertical coordinate of the end point of the sliding track, to obtain a longitudinal displacement dy; calculating coordinates $(x'_0+dx, y'_0+dy)$ of a new reference point; and calculating a widget area determined by the coordinates $(x'_0+dx, y'_0+dy)$ of the new reference point and the coordinates $(x_0, y_0)$ of the fixed point.

In the second possible implementation manner of the second aspect, a fourth possible implementation manner of the second aspect is further provided, in the fourth possible implementation manner of the second aspect, the if a fix instruction triggered by the user at a preset fixed point is received, determining the widget area according to the end point of the sliding track and the preset fixed point includes receiving a fix instruction triggered by the user at a fixed point, where the fixed point is any vertex of the widget, and coordinates of the fixed point are $(x_0, y_0)$; and if the fix instruction is received, acquiring coordinates $(x_1, y_1)$ of the end point of the sliding track; and calculating a widget area determined by the coordinates $(x_1, y_1)$ of the end point of the sliding track and the coordinates $(x_0, y_0)$ of the fixed point.

According to a third aspect, the present disclosure provides a widget area adjustment apparatus, including a switching unit configured to enter a widget edit mode according to a startup instruction triggered by a user; an acquiring unit configured to acquire a sliding track triggered by the user in a widget that has entered the edit mode, where the sliding track is used to adjust a widget area; and a determining unit configured to determine the widget area according to an end position of the widget and a position of a screen border, where the end position of the widget is determined by an offset of the sliding track acquired by the acquiring unit.

In a first possible implementation manner of the third aspect, the acquiring unit is further configured to acquire the sliding track triggered by the user in an internal region of the widget that has entered the edit mode.

In implementation manners of the third aspect, a second possible implementation manner of the third aspect is further provided, and in the second possible implementation manner of the third aspect, the determining unit includes a determining subunit configured to determine a displacement according to a start point and an end point of the sliding track, where the displacement is used to indicate displacements of vertexes of the widget; a calculation subunit configured to calculate the end position of the widget according to the displacement determined by the determining subunit and a start position of the widget, where the end position of the widget and the start position of the widget are both indicated by coordinates of the four vertexes of the widget, the start position of the widget is represented by positions of vertexes that are of the widget and corresponding to the start point of the sliding track, and the end position of the widget is represented by positions of vertexes that are of the widget and corresponding to the end point of the sliding track; and an acquiring subunit configured to acquire coordinates of four vertexes of the screen border, where the calculation subunit is further configured to, when a coordinate that exceeds a coordinate range indicated by the coordinates of the four vertexes of the screen border exists in coordinates of the four vertexes of the end position of the widget, calculate an area of an overlap region between the widget and the screen border, where the area of the overlap region is the widget area.

In the implementation manners of the third aspect, a third possible implementation manner of the third aspect is further provided, and in the third possible implementation manner of the third aspect, the switching unit is further configured to display the widget in an activation state according to the startup instruction triggered by the user.

According to a fourth aspect, the present disclosure provides a widget area adjustment apparatus, including a switching unit configured to enter a widget edit mode according to a startup instruction triggered by a user; an acquiring unit configured to acquire a sliding track triggered by the user in an internal region of a widget that has entered the edit mode, where the sliding track is used to adjust a widget area; and a determining unit configured to, if a fix instruction triggered by the user at a preset fixed point is received, determine the widget area according to the preset fixed point, a reference point corresponding to the preset fixed point, and displacements corresponding to a start point and an end point of the sliding track, or determine the widget area according to an end point of the sliding track and the preset fixed point.

In a first possible implementation manner of the fourth aspect, the acquiring unit is further configured to acquire the sliding track triggered by the user in an internal region of the widget that has entered the edit mode.

In implementation manners of the fourth aspect, a second possible implementation manner of the fourth aspect is further provided, and in the second possible implementation manner of the fourth aspect, the switching unit is further configured to display the widget in an activation state according to the startup instruction triggered by the user, and display a fixed icon at a fixed point of a border of the widget, where the fixed icon is used to indicate whether the widget is fixed.

In the second possible implementation manner of the fourth aspect, a third possible implementation manner of the fourth aspect is further provided, and in the third possible implementation manner of the fourth aspect, the determining unit includes a receiving subunit configured to receive a fix instruction triggered by the user at a fixed point, where the fixed point is any vertex of the widget, and coordinates of the fixed point are $(x_0, y_0)$; an acquiring subunit configured to, when the fix instruction is received, acquire coordinates $(x'_0, y'_0)$ of a reference point that is on the border of the widget and forms a diagonal line with the fixed point; and a calculation subunit configured to subtract a horizontal coordinate of the start point of the sliding track from a horizontal coordinate of the end point of the sliding track, to obtain a lateral displacement dx; subtract a vertical coordinate of the start point of the sliding track from a vertical coordinate of the end point of the sliding track, to obtain a longitudinal displacement dy; calculate coordinates $(x'_0+dx, y'_0+dy)$ of a new reference point; and calculate a widget area determined by the coordinates $(x'_0+dx, y'_0+dy)$ of the new reference point and the coordinates $(x_0, y_0)$ of the fixed point.

In the second possible implementation manner of the fourth aspect, a fourth possible implementation manner of the fourth aspect is further provided, and in the fourth possible implementation manner of the fourth aspect, the receiving unit is further configured to receive the fix instruction triggered by the user at the fixed point, where the fixed point is any vertex of the widget, and the coordinates of the fixed point are $(x_0, y_0)$; the acquiring unit is further configured to, when the fix instruction is received, acquire coordinates $(x_1, y_1)$ of the end point of the sliding track; and the calculation unit is further configured to calculate a widget area determined by the coordinates $(x_1, y_1)$ of the end point of the sliding track and the coordinates $(x_0, y_0)$ of the fixed point.

By means of the widget area adjustment method and apparatus that are provided in the present disclosure, it can be determined, according to a startup instruction, that a widget enters an edit mode, a sliding track triggered by a user is received in an internal region of the widget, and an area of the widget is determined according to an end position of the widget and a position of a screen border, where the end position of the widget is determined by an offset of the sliding track; or if a fix instruction triggered by the user at a preset fixed point is received, the widget area is determined according to the preset fixed point, a reference point corresponding to the preset fixed point, and displacements corresponding to a start point and an end point of the sliding track, or the widget area is determined according to an end point of the sliding track and the preset fixed point. In the prior art, the user needs to trigger an operation on a border of the widget, where a touch area is small, causing low user operation accuracy. In the present disclosure, the user can adjust, in the internal region of the widget, the widget area using the sliding track. An area of the internal region of the widget is greater than an area of the border of the widget, and therefore the user operation accuracy is improved.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

FIG. 8 is a schematic diagram of another usage scenario according to an embodiment of the present disclosure;

FIG. 9 is a flowchart of a fifth widget area adjustment method according to an embodiment of the present disclosure;

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
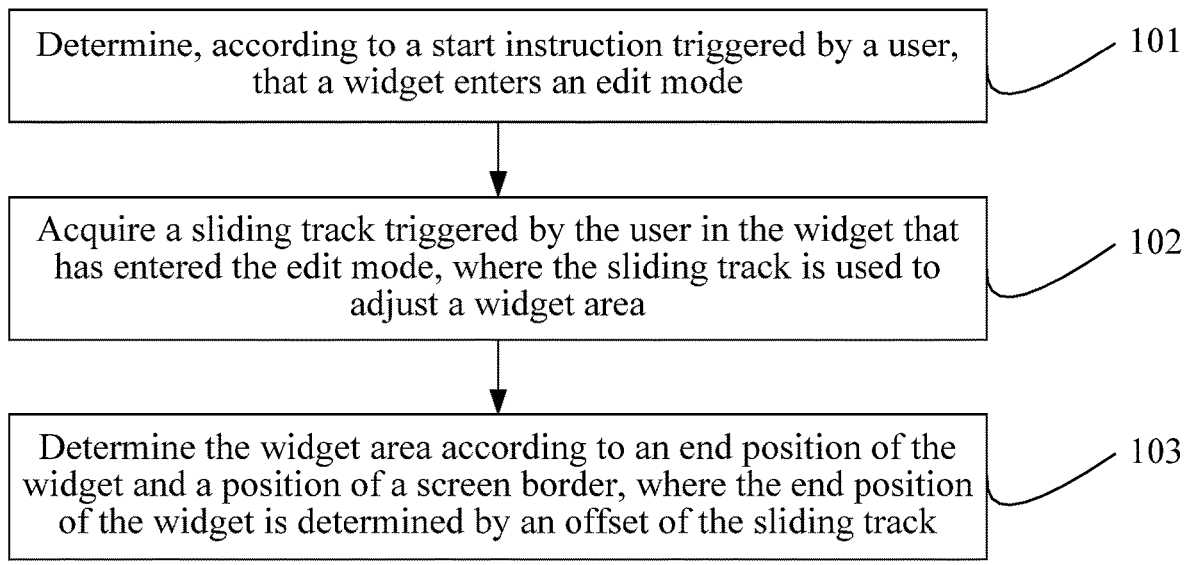
FIG. 1 is a flowchart of a first widget area adjustment method according to an embodiment of the present disclosure.

An embodiment of the present disclosure provides a widget area adjustment method, where the method is applied to an electronic device such as a smartphone or a tablet computer. As shown in FIG. 1, the method includes the following steps.

Step 101: Determine, according to a startup instruction triggered by a user, that a widget enters an edit mode.

When the user touches and holds (for over 1 second) the widget using a finger, the startup instruction can be triggered. The user may also trigger the startup instruction by continuously tapping the widget. After the widget enters the edit mode, a display manner of the widget changes, for example, an internal region of the widget is filled with something. In addition, a gesture such as a sliding track triggered by the user in the internal region of the widget is parsed according to a parsing manner in the edit mode, for example, in a non-edit mode, a longitudinal sliding track is parsed into an instruction for browsing internal information of the widget; in the edit mode, a longitudinal sliding track is parsed into an instruction for moving a region of the widget.

Step 102: Acquire a sliding track triggered by the user in the widget that has entered the edit mode, where the sliding track is used to adjust a widget area.

More specifically, the sliding track triggered by the user in the internal region of the widget that has entered the edit mode is acquired.

The sliding track is triggered by the user in the internal region of the widget that has entered the edit mode, and may be a sliding track for moving the region of the widget, or may be a sliding track for directly adjusting the widget area.

Step 103: Determine the widget area according to an end position of the widget and a position of a screen border, where the end position of the widget is by an offset of the sliding track.

A start position and the end position of the widget are both indicated jointly using coordinates of four vertexes of the widget, for example, {(1,1), (1,2), (2,2), (2,1)}, where the positions are coordinates of vertexes arranged in turn anti-clockwise starting from a vertex in the lower left corner. The position of the screen border may be indicated jointly by coordinates of four vertexes of the screen border, and is also a maximum range within which the widget may actually move, for example, {(0,0), (0,4), (4,4), (4,0)}, where this position is coordinates of vertexes arranged in turn anti-clockwise starting from a vertex in the lower left corner.

The end position of the widget after the movement may be determined according to the sliding track, where this position may be within the maximum range within which the widget may actually move, or the widget may move beyond the maximum range within which the widget may actually move. If within the maximum range within which the widget may actually move, that is, within the screen border, the widget area does not change. If beyond the maximum range within which the widget may actually move, it is determined that an area of an overlap region between the end position of the widget and the position of the screen border is the widget area.

By means of the widget area adjustment method provided in the present disclosure, it can be determined, according to a startup instruction, that a widget enters an edit mode, a sliding track triggered by a user is received in an internal region of the widget, and an area of the widget is determined according to an end position of the widget and a position of a screen border, where the end position of the widget is determined by an offset of the sliding track. In the prior art, the user needs to trigger an operation on a border of the widget, where a touch area is small, causing low user operation accuracy. In the present disclosure, the user can adjust, in the internal region of the widget, the widget area using the sliding track. Because an area of the internal region of the widget is greater than an area of the border of the widget, the user operation accuracy is improved.

Figure 2:
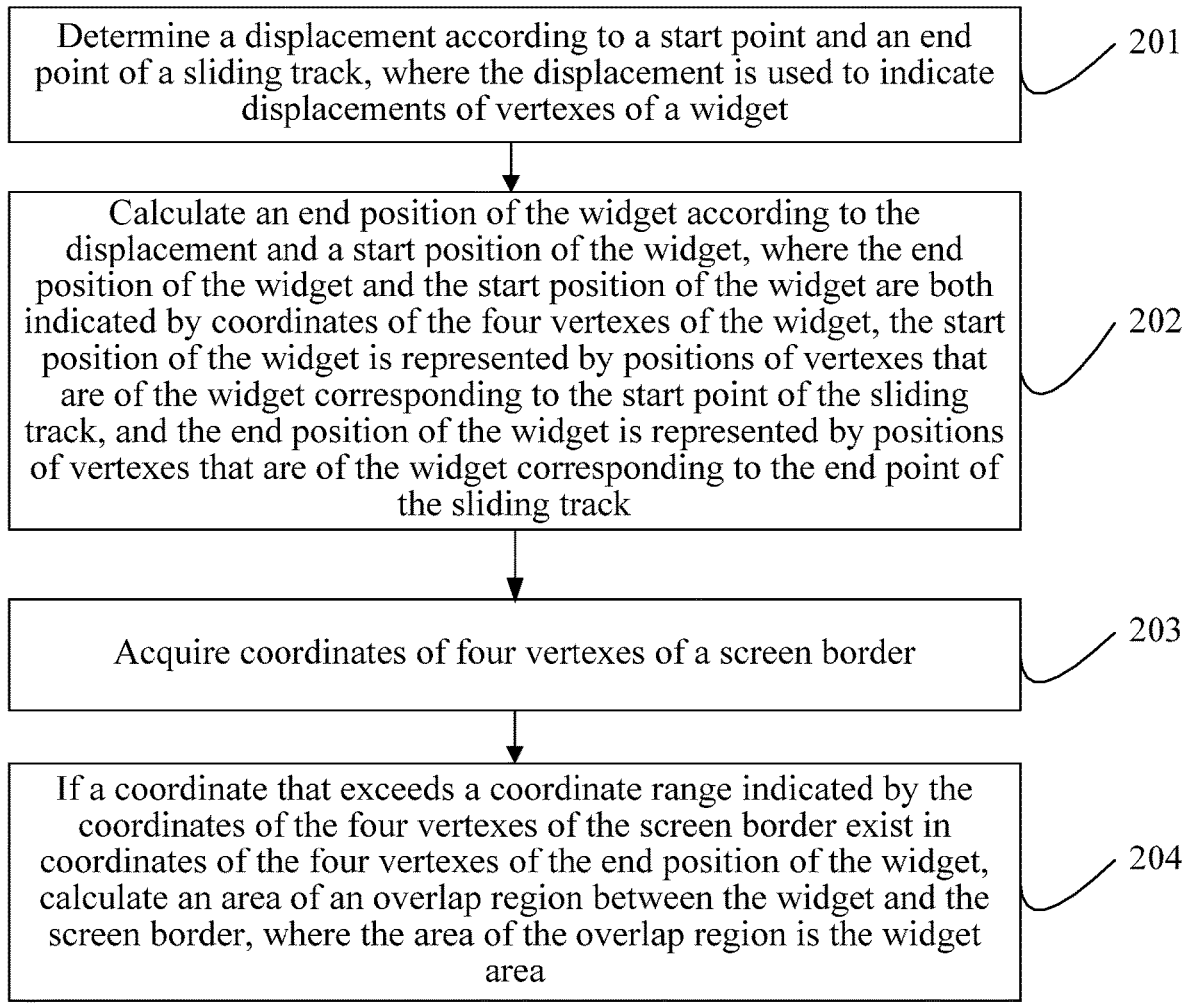
FIG. 2 is a flowchart of a second widget area adjustment method according to an embodiment of the present disclosure.

An embodiment of the present disclosure further provides a widget area adjustment method, as a description of the method shown in FIG. 1. As shown in FIG. 2, step 103 of determining the widget area according to an end position of the widget and a position of a screen border, where the end position of the widget is determined by an offset of the sliding track may be implemented in the following manner.

Step 201: Determine a displacement according to a start point and an end point of the sliding track, where the displacement is used to indicate displacements of vertexes of the widget.

Coordinates of the start point of the sliding track are subtracted from coordinates of the end point of the sliding track, to obtain the displacement. The sliding track is used to move the widget. The displacement is not greater than a maximum value of coordinate differences between the vertexes of the screen border.

Step 202: Calculate the end position of the widget according to the displacement and a start position of the widget, where the end position of the widget and the start position of the widget are both indicated by coordinates of the four vertexes of the widget, the start position of the widget is represented by positions of vertexes that are of the widget and corresponding to the start point of the sliding track, and the end position of the widget is represented by positions of vertexes that are of the widget and corresponding to the end point of the sliding track.

The displacement determined according to the start point and the end point of the sliding track is the displacements of the four vertexes of the widget.

Step 203: Acquire coordinates of four vertexes of the screen border.

The coordinates of the four vertexes of the screen border are preset coordinates, and may be directly read from a storage medium.

Step 204: If a coordinate that exceeds a coordinate range indicated by the coordinates of the four vertexes of the screen border exists in coordinates of the four vertexes of the end position of the widget, calculate an area of an overlap region between the widget and the screen border, where the area of the overlap region is the widget area.

From the perspective of a user, a manifestation of that the coordinate that exceeds the coordinate range indicated by the coordinates of the four vertexes of the screen border exists in the coordinates of the four vertexes of the end position of the widget is that the widget after the movement is partially moved beyond the screen.

From the perspective of a machine, if a horizontal coordinate in the coordinates of the four vertexes of the end position of the widget is less than a minimum value of horizontal coordinates in the coordinates of the four vertexes of the screen border, or a horizontal coordinate in the coordinates of the four vertexes of the end position of the widget is greater than a maximum value of horizontal coordinates in the coordinates of the four vertexes of the screen border; and/or if a vertical coordinate in the coordinates of the four vertexes of the end position of the widget is less than a minimum value of vertical coordinates in the coordinates of the four vertexes of the screen border, or a vertical coordinate in the coordinates of the four vertexes of the end position of the widget is greater than a maximum value of vertical coordinates in the coordinates of the four vertexes of the screen border, it may be determined that the coordinate that exceeds the coordinate range indicated by the coordinates of the four vertexes of the screen border exists in the coordinates of the four vertexes of the end position of the widget.

The overlap region between the widget and the screen border is a region in which the widget does not exceed a screen border indication range. The screen border indication range is an internal region delineated by the screen border. The overlap region is a smallest rectangular region that is jointly indicated by the coordinates of the four vertexes of the widget and the coordinates of the four vertexes of the screen border.

When the widget is a rectangle, the overlap region is a rectangular region delineated by the widget and the screen border.

The following provides a description using a usage scenario.

Figure 3:
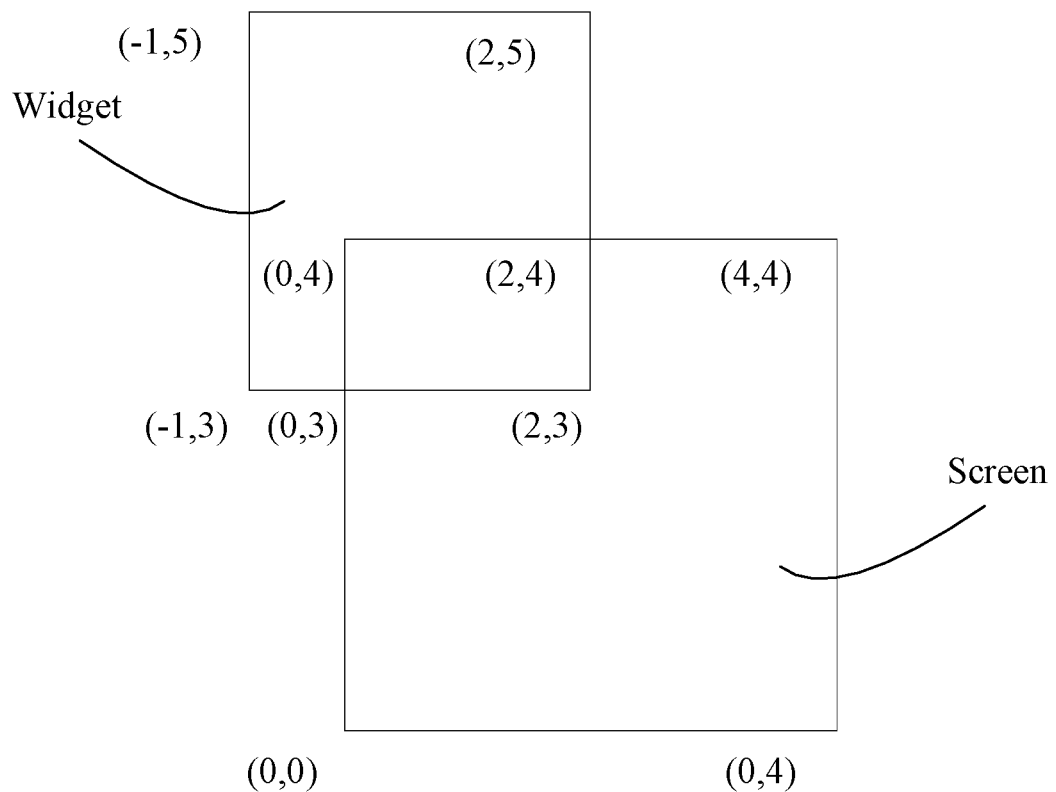
FIG. 3 is a schematic diagram of a usage scenario according to an embodiment of the present disclosure.

As shown in FIG. 3, after the user triggers a sliding track inside a widget, a region {(−1,3), (−1,5), (2,5), (2,3)} of the widget corresponding to an end point of the sliding track is acquired. Acquired coordinates of a screen border are {(0,0), (0,4), (4,4), (4,0)}. A horizontal coordinate in coordinates of four vertexes corresponding to the end point of the sliding track is less than a minimum value of horizontal coordinates in the coordinates of four vertexes of the screen border (−1<0), and a vertical coordinate in the coordinates of the four vertexes that are of the widget and corresponding to the end point of the sliding track is greater than a maximum value of vertical coordinates in the coordinates of the four vertexes of the screen border (5>4). Therefore, it is determined that an area of an overlap region between the widget and the screen border is a widget area. The overlap region is a smallest rectangular region {(0,3), (0,4), (2,4), (2,3)} that is jointly indicated by the coordinates of the four vertexes of the widget and the coordinates of the four vertexes of the screen border.

By means of the widget area adjustment method provided in this embodiment of the present disclosure, an end position of a widget can be calculated according to a displacement determined by a start point and an end point of a sliding track, and a start position of the widget; and if a coordinate that exceeds a coordinate range indicated by coordinates of four vertexes of a screen border exists in coordinates of four vertexes of the end position of the widget, an area of an overlap region between the widget and the screen border is calculated, where the area of the overlap region is a widget area. By "tailoring" the widget according to the screen border, an effect of adjusting the widget area is achieved. In the prior art, small dots of end points of sides need to be dragged for multiple times, and there are many operation steps. In this embodiment of the present disclosure, an effect of adjusting the widget area can be achieved according to an instruction of a user for moving the widget.

Figure 4:
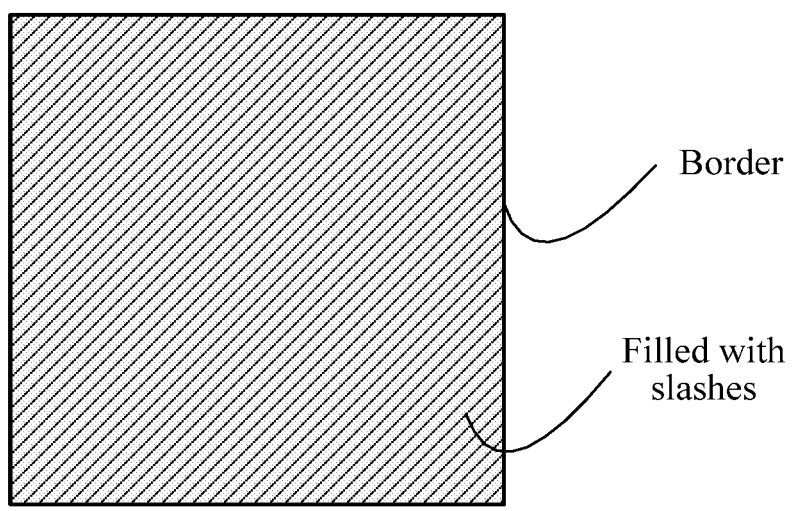
FIG. 4 is a display manner of a widget edit mode according to an embodiment of the present disclosure.

An embodiment of the present disclosure further provides a widget area adjustment method, as a description of the method shown in FIG. 1. In step 101 of entering a widget edit mode according to a startup instruction triggered by a user, the widget edit mode may be implemented in the following manner: displaying a widget in an activation state according to the startup instruction triggered by the user. As shown in FIG. 4, a border of a widget is displayed according to the startup instruction triggered by the user, and the activation state may be displayed in a manner of being filled with slashes. In addition, the activation state may also be displayed in a manner such as indicating a border of the widget using a dashed line.

By means of the widget area adjustment method provided in this embodiment of the present disclosure, a widget in an activation state is displayed, which can present a current state of the widget more intuitively and simplify a user operation.

Figure 5:
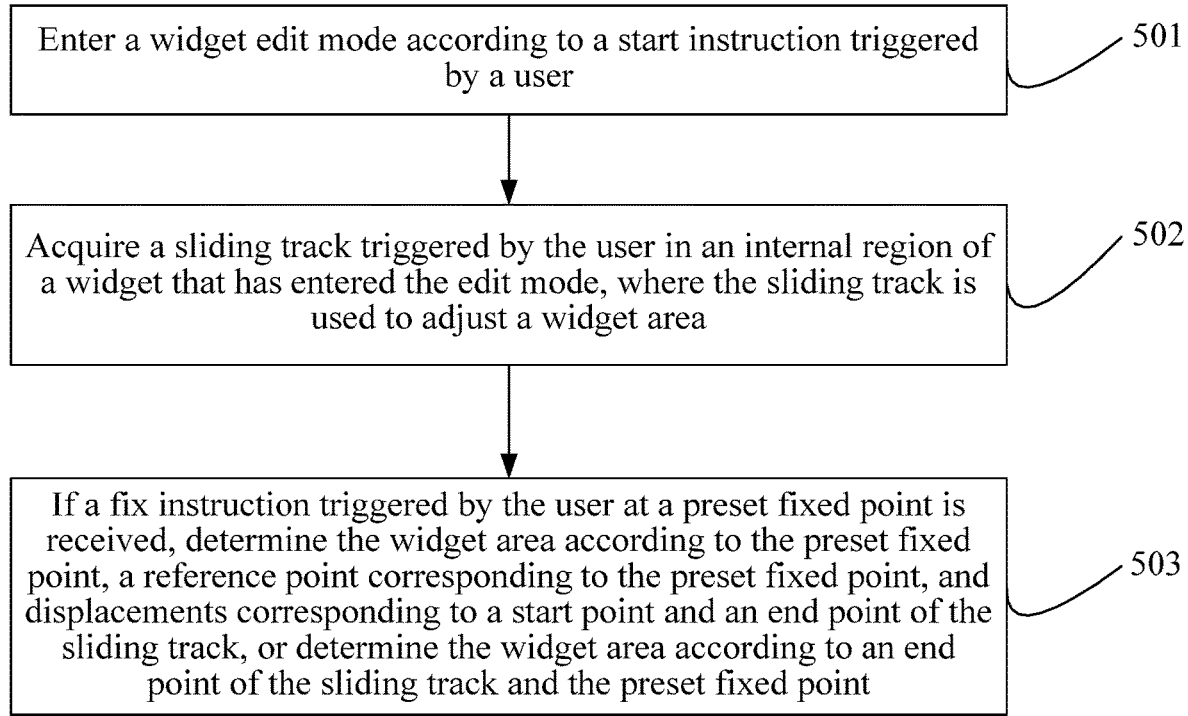
FIG. 5 is a flowchart of a third widget area adjustment method according to an embodiment of the present disclosure.

An embodiment of the present disclosure further provides a widget area adjustment method. As shown in FIG. 5, the method includes the following steps.

Step 501: Enter a widget edit mode according to a startup instruction triggered by a user.

More specifically, a widget in an activation state is displayed according to the startup instruction triggered by the user, and a fixed icon is displayed at a fixed point of a border of the widget, where the fixed icon is used to indicate whether the widget is fixed.

Figure 6:
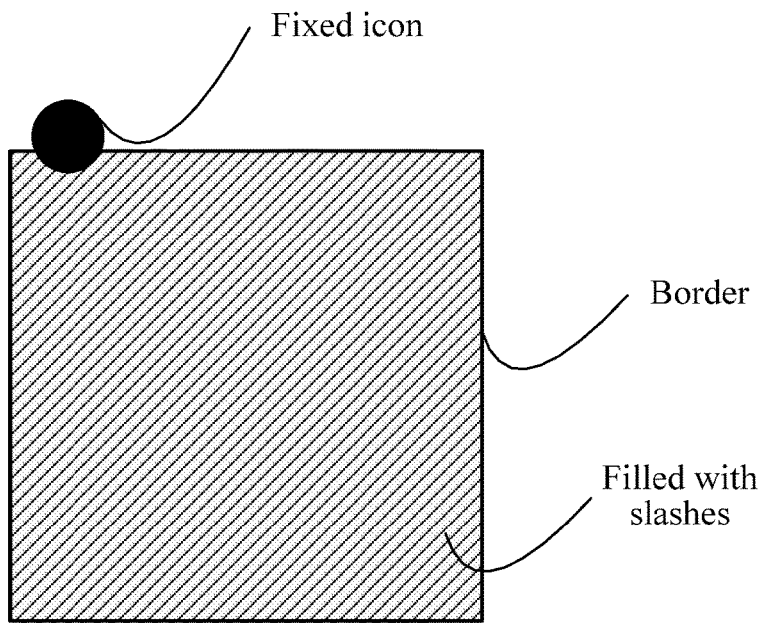
FIG. 6 is a display manner of another widget edit mode according to an embodiment of the present disclosure.

As shown in FIG. 6, a border of a widget is displayed according to a startup instruction triggered by a user, a region delineated by a border of a widget is filled with slashes, and a fixed icon is displayed at a fixed point of the border of the widget, where the fixed icon is used to indicate whether the widget is fixed.

After the widget enters the edit mode, a display manner of the widget changes accordingly, such that the user knows that the widget is currently in the edit mode. The edit mode has two types of display manners: in one type, only the border of the widget and filling lines are displayed; in the other type, in addition to the border of the widget and the filling lines, the fixed icon is displayed at the fixed point of the border of the widget. The fixed icon is used to indicate whether the widget is fixed, and content of the fixed icon may be a picture of a push pin, a paper clip, a lock block, or the like.

Displaying the fixed icon at the fixed point can present a current state of the widget more intuitively and simplify a user operation.

Step 502: Acquire a sliding track triggered by the user in an internal region of a widget that has entered the edit mode, where the sliding track is used to adjust a widget area.

More specifically, the sliding track triggered by the user in the internal region of the widget that has entered the edit mode is acquired. Step 501 and step 502 are the same as step 101 and step 102 in the method shown in FIG. 1.

Step 503: If a fix instruction triggered by the user at a preset fixed point is received, determine the widget area according to the preset fixed point, a reference point corresponding to the preset fixed point, and displacements corresponding to a start point and an end point of the sliding track, or determine the widget area according to an end point of the sliding track and the preset fixed point.

The fix instruction is triggered by the user at the fixed point of the border of the widget, by performing an operation such as tapping on an icon (such as a push pin icon) at the fixed point. After the fix instruction is received, a zoom ratio of the widget is determined according to a ratio of a region of the widget corresponding to the start point of the sliding track to a region of the widget corresponding to the end point, and then the widget area is determined.

By means of the widget area adjustment method provided in this embodiment of the present disclosure, it can be determined, according to a startup instruction, that a widget enters an edit mode, and a sliding track triggered by a user is received in an internal region of the widget; and if a fix instruction triggered by the user at a preset fixed point is received, a widget area is determined according to the preset fixed point, a reference point corresponding to the preset fixed point, and displacements corresponding to a start point and an end point of the sliding track, or the widget area is determined according to an end point of the sliding track and the preset fixed point. In the prior art, the user needs to trigger an operation on a border of the widget, where a touch area is small, causing low user operation accuracy. In the present disclosure, the user can adjust, in the internal region of the widget, the widget area using the sliding track. Because an area of the internal region of the widget is greater than an area of the border of the widget, the user operation accuracy is improved.

Figure 7:
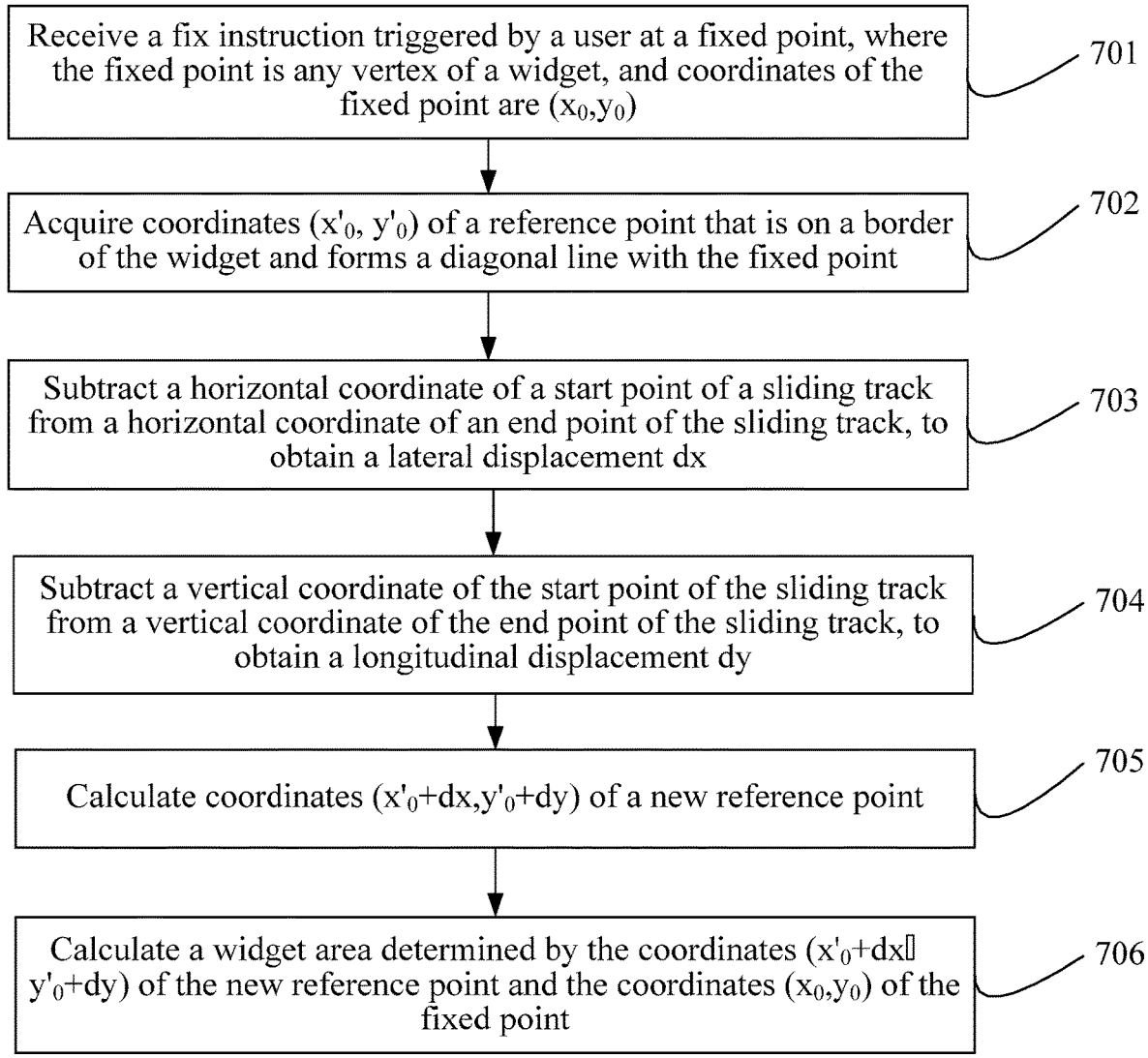
FIG. 7 is a flowchart of a fourth widget area adjustment method according to an embodiment of the present disclosure.

An embodiment of the present disclosure further provides a widget area adjustment method, as a description of the method shown in FIG. 5. As shown in FIG. 7, step 503 of, if a fix instruction triggered by the user at a preset fixed point is received, determining the widget area according to the preset fixed point, a reference point corresponding to the preset fixed point, and displacements corresponding to a start point and an end point of the sliding track, or determining the widget area according to an end point of the sliding track and the preset fixed point may be implemented in the following manner.

Step 701: Receive a fix instruction triggered by a user at a fixed point, where the fixed point is any vertex of a widget, and coordinates of the fixed point are $(x_0, y_0)$.

The fixed icon is displayed at the fixed point. Therefore, when the user taps the fixed icon, the fix instruction can be triggered, and the widget enters a fixed state. In this case, the coordinates of the fixed point do not change any more in this adjustment operation, and in addition, the fixed icon is displayed as a fixed pattern. When the user taps the fixed icon again, the fixed state of the widget is canceled, and in addition, the fixed icon is displayed as an unfixed pattern.

If the fix instruction is received:

Step 702: Acquire coordinates $(x'_0, y'_0)$ of a reference point that is on a border of the widget and forms a diagonal line with the fixed point.

One diagonal line can determine one rectangle. Therefore, the coordinates $(x_0, y_0)$ of the fixed point and the coordinates $(x'_0, y'_0)$ of the reference point can determine a region of the widget before the adjustment.

Step 703: Subtract a horizontal coordinate of the start point of the sliding track from a horizontal coordinate of the end point of the sliding track, to obtain a lateral displacement dx.

Step 704: Subtract a vertical coordinate of the start point of the sliding track from a vertical coordinate of the end point of the sliding track, to obtain a longitudinal displacement dy.

If start coordinates of the sliding track are $(x_1, y_1)$, and coordinates of the end point are $(x_2, y_2)$, $dx=x_2-x_1$ and $dy=y_2-y_1$.

Step 705: Calculate coordinates $(x'_0+dx, y'_0+dy)$ of a new reference point.

Step 706: Calculate a widget area determined by the coordinates $(x'_0+dx, y'_0+dy)$ of the new reference point and the coordinates $(x_0, y_0)$ of the fixed point.

The following describes the steps shown in FIG. 7 using a usage scenario.

As shown in FIG. 8, a user taps a fixed icon in the upper left corner of a border of a widget, a fixed point is a vertex in the upper left corner of the widget, coordinates $(x_0, y_0)$ are $(1,3)$, and coordinates $(X'_0, y'_0)$ of a reference point that forms a diagonal line with the fixed point are $(4,0)$. A start point $(x_1, y_1)$ of a sliding track is $(3,1)$, and an end point $(x_2, y_2)$ is $(2,2)$. Then, $dx=2-3=-1$, and $dy=2-1=1$. Therefore, coordinates $(x'_0+dx, y'_0+dy)$ of a new reference point are $(4-1, 3+1)=(3,1)$. A region of the widget determined according to the coordinates $(1,3)$ of the fixed point and the coordinates $(3,1)$ of the new reference point is $\{(1,1), (1,3), (3,3), (3,1)\}$.

An embodiment of the present disclosure further provides a widget area adjustment method, as a description of the method shown in FIG. 5. As shown in FIG. 9, step 503 of, if a fix instruction triggered by the user at a preset fixed point is received, determining the widget area according to the preset fixed point, a reference point corresponding to the preset fixed point, and displacements corresponding to a start point and an end point of the sliding track, or determining the widget area according to an end point of the sliding track and the preset fixed point may be implemented in the following manner.

Step 901: Receive a fix instruction triggered by a user at a fixed point, where the fixed point is any vertex of a widget, and coordinates of the fixed point are $(x_0, y_0)$.

If the fix instruction is received:

Step 902: Acquire coordinates $(x_1, y_1)$ of the end point of the sliding track.

Step 903: Calculate a widget area determined by the coordinates $(x_1, y_1)$ of the end point of the sliding track and the coordinates $(x_0, y_0)$ of the fixed point.

The area determined by the coordinates $(x_1, y_1)$ of the end point of the sliding track and the coordinates $(x_0, y_0)$ of the fixed point is the widget area.

The following describes the steps shown in FIG. 9 using a usage scenario.

The user taps the fixed icon in the upper left corner of the border of the widget, where the fixed point is a vertex in the upper left corner of the widget, the coordinates $(x_0, y_0)$ are $(1,3)$, and coordinates $(x_2, y_2)$ of the end point of the sliding track are $(2,2)$. A region of the widget determined according to the coordinates $(1,3)$ of the fixed point and the coordinates $(2,2)$ of the end point of the sliding track is $\{(1,2), (1,3), (2,3), (2,1)\}$.

By means of the widget area adjustment method provided in this embodiment of the present disclosure, after a fix instruction triggered by a user, an area of a widget can be adjusted according to a displacement of a sliding track or coordinates of an end point of the sliding track. The user can acquire whether the widget is currently in a fixed state according to different patterns of a fixed icon. When the widget is in the fixed state, the user can adjust the area of the widget by performing a sliding operation in an internal region of a border of the widget.

Starting from a version of ANDROID 4.0, in a case in which a system requirement is met, switching can be performed between several different sizes. The switching between the different sizes is defined according to a grid of the home. For a common wide quarter video graphics array (WQVGA), a screen is a 4×4 grid, that is, four rows and four columns, and a widget is displayed in a full region manner. In this case, the screen is divided into 4×4 coordinate regions, where coordinates of each vertex are corresponding to one coordinate region. After coordinate regions in which coordinates of four vertexes are located are determined, a region of the widget is displayed in a full grid manner in the coordinate regions.

Figure 10:
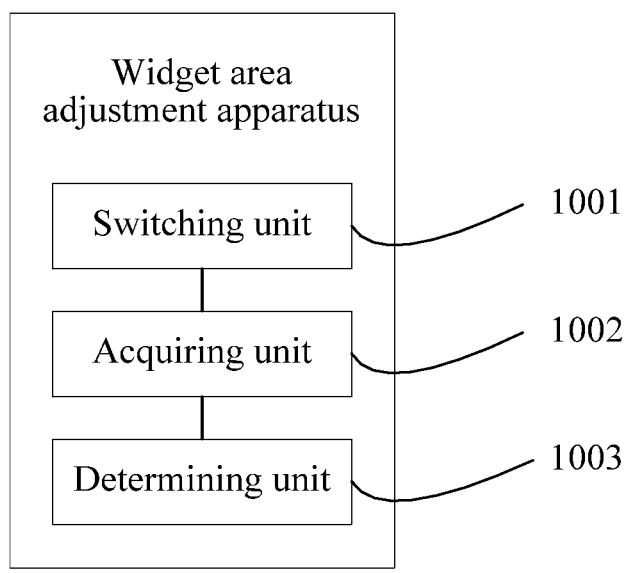
FIG. 10 is a schematic structural diagram of a first widget area adjustment apparatus according to an embodiment of the present disclosure.

An embodiment of the present disclosure further provides a widget area adjustment apparatus, where the apparatus is located in an electronic device. As shown in FIG. 10, the apparatus includes a switching unit 1001 configured to enter a widget edit mode according to a startup instruction triggered by a user; an acquiring unit 1002 configured to acquire a sliding track triggered by the user in a widget that has entered the edit mode, where the sliding track is used to adjust a widget area; and a determining unit 1003 configured to determine the widget area according to an end position of the widget and a position of a screen border, where the end position of the widget is determined by an offset of the sliding track acquired by the acquiring unit 1002.

By means of the widget area adjustment apparatus provided in the present disclosure, it can be determined, according to a startup instruction, that a widget enters an edit mode, a sliding track triggered by a user is received in an internal region of the widget, and an area of the widget is determined according to an end position of the widget and a position of a screen border, where the end position of the widget is determined by an offset of the sliding track. In the prior art, the user needs to trigger an operation on a border of the widget, where a touch area is small, causing low user operation accuracy. In the present disclosure, the user can adjust, in the internal region of the widget, the widget area using the sliding track. Because an area of the internal region of the widget is greater than an area of the border of the widget, the user operation accuracy is improved.

Figure 11:
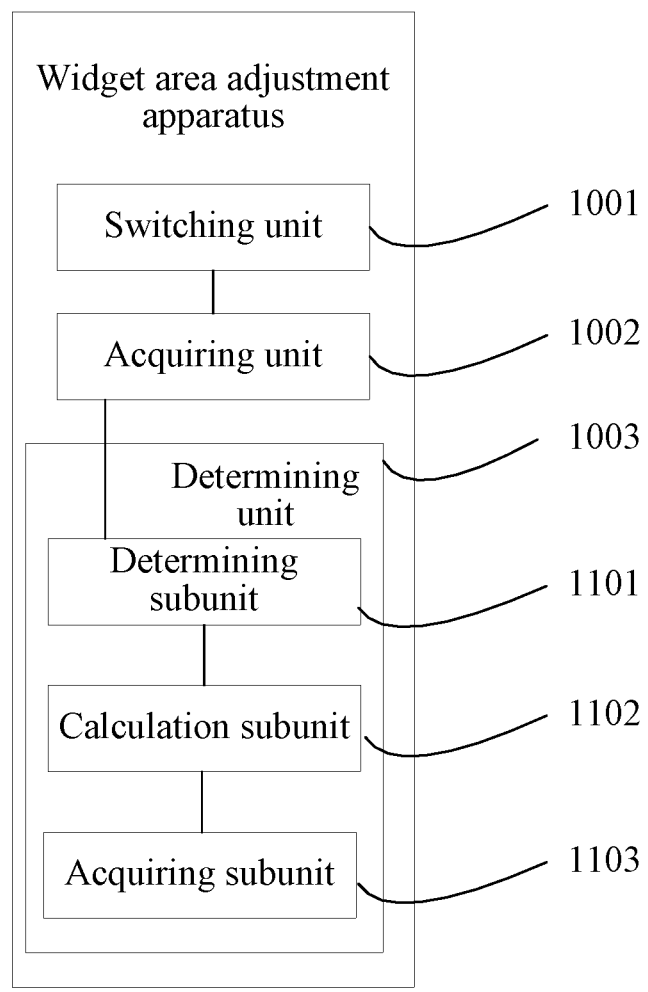
FIG. 11 is a schematic structural diagram of a second widget area adjustment apparatus according to an embodiment of the present disclosure.

Further, as shown in FIG. 11, an embodiment of the present disclosure further provides a widget area adjustment apparatus, where the acquiring unit 1002 is further configured to acquire the sliding track triggered by the user in an internal region of the widget that has entered the edit mode.

The determining unit 1003 includes a determining subunit 1101 configured to determine a displacement according to a start point and an end point of the sliding track, where the displacement is used to indicate displacements of vertexes of the widget; a calculation subunit 1102 configured to calculate the end position of the widget according to the displacement determined by the determining subunit 1101 and a start position of the widget, where the end position of the widget and the start position of the widget are both indicated by coordinates of the four vertexes of the widget, the start position of the widget is represented by positions of vertexes that are of the widget and corresponding to the start point of the sliding track, and the end position of the widget is represented by positions of vertexes that are of the widget and corresponding to the end point of the sliding track; and an acquiring subunit 1103 configured to acquire coordinates of four vertexes of the screen border, where the calculation subunit 1102 is further configured to, when a coordinate that exceeds a coordinate range indicated by the coordinates of the four vertexes of the screen border exists in coordinates of the four vertexes of the end position of the widget, calculate an area of an overlap region between the widget and the screen border, where the area of the overlap region is the widget area.

The switching unit 1001 is further configured to display the widget in an activation state according to the startup instruction triggered by the user.

By means of the widget area adjustment apparatus provided in this embodiment of the present disclosure, an end position of a widget can be calculated according to a displacement determined by a start point and an end point of a sliding track, and a start position of the widget; and if a coordinate that exceeds a coordinate range indicated by coordinates of four vertexes of a screen border exists in coordinates of four vertexes of the end position of the widget, an area of an overlap region between the widget and the screen border is calculated, where the area of the overlap region is a widget area. By "tailoring" the widget according to the screen border, an effect of adjusting the widget area is achieved. In the prior art, small dots of end points of sides need to be dragged for multiple times, and there are many operation steps. In this embodiment of the present disclosure, an effect of adjusting the widget area can be achieved according to an instruction of a user for moving the widget. In addition, a widget in an activation state is displayed, such that a current state of the widget can be indicated more intuitively, simplifying a user operation.

Figure 12:
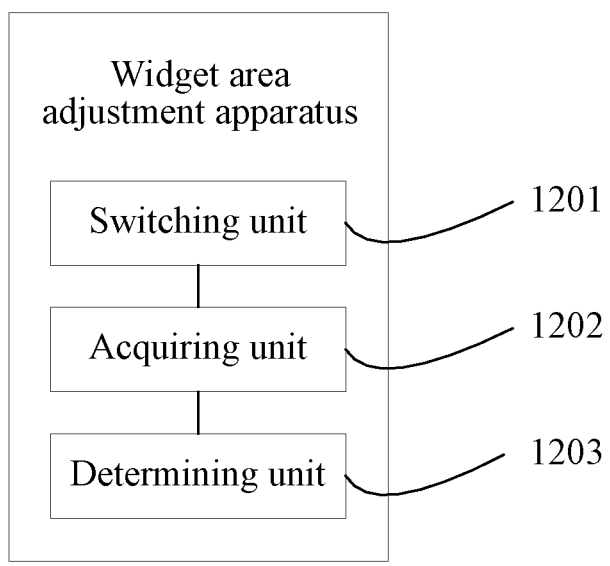
FIG. 12 is a schematic structural diagram of a third widget area adjustment apparatus according to an embodiment of the present disclosure.

An embodiment of the present disclosure further provides a widget area adjustment apparatus, where the apparatus is located in an electronic device. As shown in FIG. 12, the apparatus includes a switching unit 1201 configured to enter a widget edit mode according to a startup instruction triggered by a user; an acquiring unit 1202 configured to acquire a sliding track triggered by the user in an internal region of a widget that has entered the edit mode, where the sliding track is used to adjust a widget area; and a determining unit 1203 configured to, if a fix instruction triggered by the user at a preset fixed point is received, determine the widget area according to the preset fixed point, a reference point corresponding to the preset fixed point, and displacements corresponding to a start point and an end point of the sliding track, or determine the widget area according to an end point of the sliding track and the preset fixed point.

By means of the widget area adjustment apparatus provided in this embodiment of the present disclosure, it can be determined, according to a startup instruction, that a widget enters an edit mode, and a sliding track triggered by a user is received in an internal region of the widget; and if a fix instruction triggered by the user at a preset fixed point is received, a widget area is determined according to the preset fixed point, a reference point corresponding to the preset fixed point, and displacements corresponding to a start point and an end point of the sliding track, or the widget area is determined according to an end point of the sliding track and the preset fixed point. In the prior art, the user needs to trigger an operation on a border of the widget, where a touch area is small, causing low user operation accuracy. In the present disclosure, the user can adjust, in the internal region of the widget, the widget area using the sliding track. Because an area of the internal region of the widget is greater than an area of the border of the widget, the user operation accuracy is improved.

Figure 13:
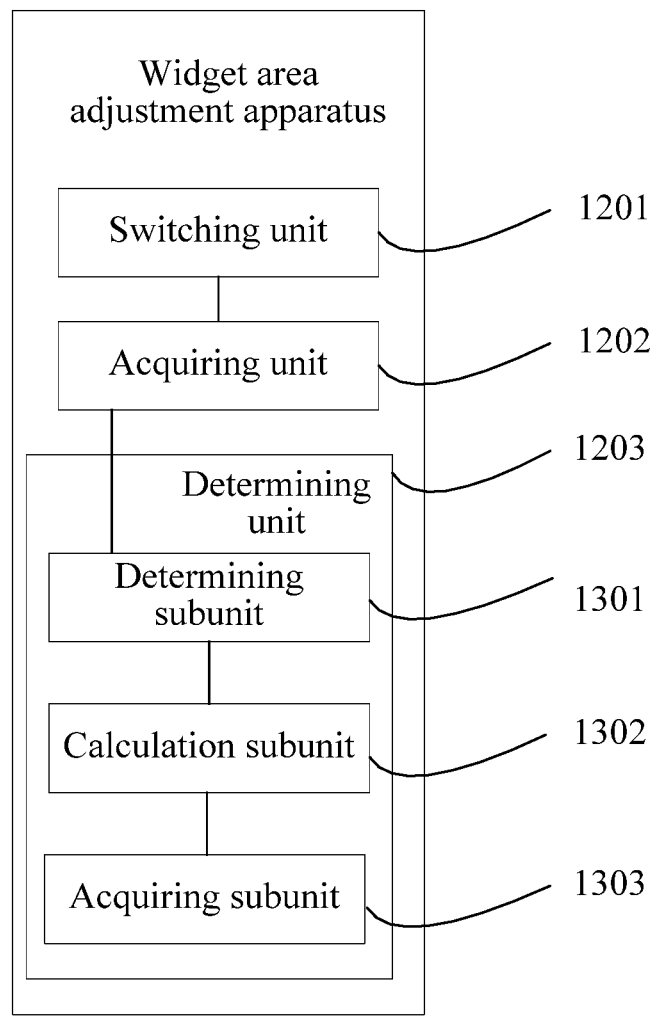
FIG. 13 is a schematic structural diagram of a fourth widget area adjustment apparatus according to an embodiment of the present disclosure.

Further, an embodiment of the present disclosure further provides a widget area adjustment apparatus. As shown in FIG. 13, the acquiring unit 1202 is further configured to acquire the sliding track triggered by the user in an internal region of the widget that has entered the edit mode.

Further, the switching unit 1201 is further configured to display the widget in an activation state according to the startup instruction triggered by the user, and display a fixed icon at a fixed point of a border of the widget, where the fixed icon is used to indicate whether the widget is fixed.

Further, the determining unit 1203 includes a receiving subunit 1301 configured to receive a fix instruction triggered by the user at a fixed point, where the fixed point is any vertex of the widget, and coordinates of the fixed point are $(x_0, y_0)$; an acquiring subunit 1302 configured to, when the fix instruction is received, acquire coordinates $(x'_0, y'_0)$ of a reference point that is on the border of the widget and forms a diagonal line with the fixed point; and a calculation subunit 1303 configured to subtract a horizontal coordinate of the start point of the sliding track from a horizontal coordinate of the end point of the sliding track, to obtain a lateral displacement dx; subtract a vertical coordinate of the start point of the sliding track from a vertical coordinate of the end point of the sliding track, to obtain a longitudinal displacement dy; calculate coordinates $(x'_0+dx, y'_0+dy)$ of a new reference point; and calculate a widget area determined by the coordinates $(x'_0+dx, y'_0+dy)$ of the new reference point and the coordinates $(x_0, y_0)$ of the fixed point.

Further, the receiving unit is further configured to receive the fix instruction triggered by the user at the fixed point, where the fixed point is any vertex of the widget, and the coordinates of the fixed point are $(x_0, y_0)$; the acquiring unit 1202 is further configured to, when the fix instruction is received, acquire coordinates $(x_1, y_1)$ of the end point of the sliding track; and the calculation unit is further configured to calculate a widget area determined by the coordinates ($x_1$, $y_1$) of the end point of the sliding track and the coordinates ($x_0$, $y_0$) of the fixed point.

By means of the widget area adjustment apparatus provided in this embodiment of the present disclosure, after a fix instruction triggered by a user, an area of a widget can be adjusted according to a displacement of a sliding track or coordinates of an end point of the sliding track. The user can acquire whether the widget is currently in a fixed state according to different patterns of a fixed icon. When the widget is in the fixed state, the user can adjust the area of the widget by performing a sliding operation in an internal region of a border of the widget.

Figure 14:
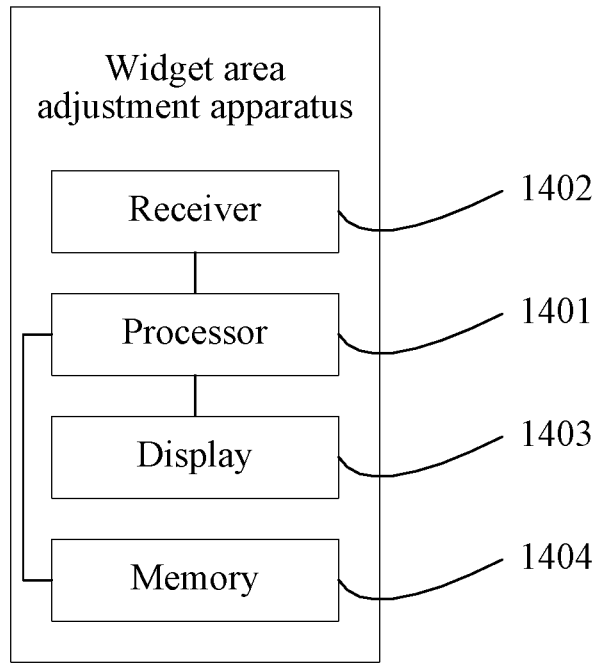
FIG. 14 is a schematic structural diagram of a fifth widget area adjustment apparatus according to an embodiment of the present disclosure.

An embodiment of the present disclosure further provides a widget area adjustment apparatus. As shown in FIG. 14, the apparatus includes a processor 1401 configured to enter a widget edit mode according to a startup instruction triggered by a user; and a receiver 1402 configured to acquire a sliding track triggered by the user in a widget that has entered the edit mode, where the sliding track is used to adjust a widget area, where the shown processor 1401 is further configured to determine the widget area according to an end position of the widget and a position of a screen border, where the end position of the widget is determined by an offset of the sliding track.

The shown apparatus further includes a memory 1404 for storing code of the method shown in FIG. 1, where the processor 1401 and the memory 1404 are coupled in a circuit, and the processor reads the code in the memory 1404 to execute the method shown in FIG. 1.

By means of the widget area adjustment apparatus provided in the present disclosure, it can be determined, according to a startup instruction, that a widget enters an edit mode, a sliding track triggered by a user is received in an internal region of the widget, and an area of the widget is determined according to an end position of the widget and a position of a screen border, where the end position of the widget is determined by an offset of the sliding track. In the prior art, the user needs to trigger an operation on a border of the widget, where a touch area is small, causing low user operation accuracy. In the present disclosure, the user can adjust, in the internal region of the widget, the widget area using the sliding track. Because an area of the internal region of the widget is greater than an area of the border of the widget, the user operation accuracy is improved.

Further, the shown receiver 1402 is further configured to receive the startup instruction triggered by the user.

The shown receiving unit is further configured to acquire the sliding track triggered by the user in the internal region of the widget that has entered the edit mode.

Further, the shown processor 1401 is further configured to determine a displacement according to a start point and an end point of the sliding track, where the displacement is used to indicate displacements of vertexes of the widget; calculate the end position of the widget according to the displacement and a start position of the widget, where the end position of the widget and the start position of the widget are both indicated by coordinates of the four vertexes of the widget, the start position of the widget is represented by positions of vertexes that are of the widget and corresponding to the start point of the sliding track, and the end position of the widget is represented by positions of vertexes that are of the widget and corresponding to the end point of the sliding track; acquire coordinates of four vertexes of the screen border; and if a coordinate that exceeds a coordinate range indicated by the coordinates of the four vertexes of the screen border exists in coordinates of the four vertexes of the end position of the widget, calculate an area of an overlap region between the widget and the screen border, where the area of the overlap region is the widget area.

Further, the shown apparatus further includes a display 1403 configured to display the widget in an activation state according to the startup instruction triggered by the user.

By means of the widget area adjustment apparatus provided in this embodiment of the present disclosure, an end position of a widget can be calculated according to a displacement determined by a start point and an end point of a sliding track, and a start position of the widget; and if a coordinate that exceeds a coordinate range indicated by coordinates of four vertexes of a screen border exists in coordinates of four vertexes of the end position of the widget, an area of an overlap region between the widget and the screen border is calculated, where the area of the overlap region is a widget area. By "tailoring" the widget according to the screen border, an effect of adjusting the widget area is achieved. In the prior art, small dots of end points of sides need to be dragged for multiple times, and there are many operation steps. In this embodiment of the present disclosure, an effect of adjusting the widget area can be achieved according to an instruction of a user for moving the widget. In addition, a widget in an activation state is displayed, such that a current state of the widget can be indicated more intuitively, simplifying a user operation.

Figure 15:
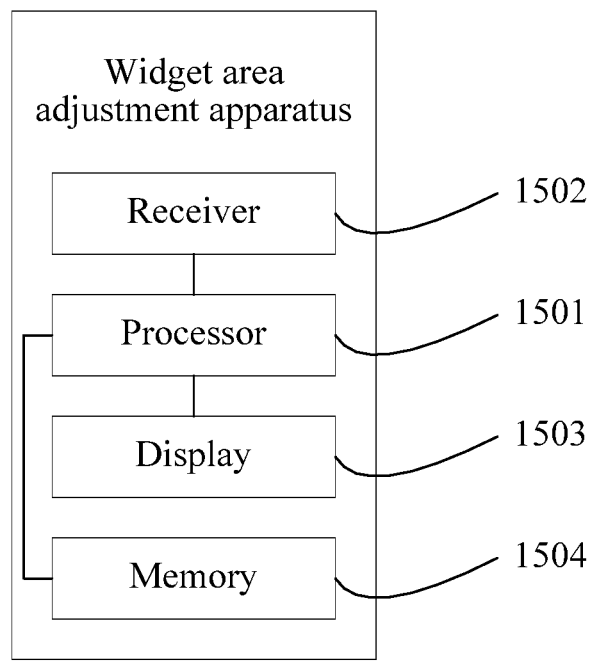
FIG. 15 is a schematic structural diagram of a sixth widget area adjustment apparatus according to an embodiment of the present disclosure.

An embodiment of the present disclosure further provides a widget area adjustment apparatus. As shown in FIG. 15, the apparatus includes a processor 1501 configured to enter a widget edit mode according to a startup instruction triggered by a user; and a receiver 1502 configured to acquire a sliding track triggered by the user in an internal region of a widget that has entered the edit mode, where the sliding track is used to adjust a widget area, where the processor 1501 is further configured to, when a fix instruction triggered by the user at a preset fixed point is received, determine the widget area according to the preset fixed point, a reference point corresponding to the preset fixed point, and displacements corresponding to a start point and an end point of the sliding track; or the processor 1501 is further configured to, when a fix instruction triggered by the user at a preset fixed point is received, determine the widget area according to an end point of the sliding track and the preset fixed point.

The shown apparatus further includes a memory 1504 for storing code of the method shown in FIG. 5, where the processor 1501 and the memory 1504 are coupled in a circuit, and the processor reads the code in the memory 1504 to execute the method shown in FIG. 1.

By means of the widget area adjustment apparatus provided in this embodiment of the present disclosure, it can be determined, according to a startup instruction, that a widget enters an edit mode, and a sliding track triggered by a user is received in an internal region of the widget; and if a fix instruction triggered by the user at a preset fixed point is received, a widget area is determined according to the preset fixed point, a reference point corresponding to the preset fixed point, and displacements corresponding to a start point and an end point of the sliding track, or the widget area is determined according to an end point of the sliding track and the preset fixed point. In the prior art, the user needs to trigger an operation on a border of the widget, where a touch area is small, causing low user operation accuracy. In the present disclosure, the user can adjust, in the internal region of the widget, the widget area using the sliding track. Because an area of the internal region of the widget is greater than an area of the border of the widget, the user operation accuracy is improved.

Further, the receiver 1502 is further configured to acquire the sliding track triggered by the user in the internal region of the widget that has entered the edit mode.

The apparatus further includes a display 1503 configured to display the widget in an activation state according to the startup instruction triggered by the user, and display a fixed icon at a fixed point of a border of the widget, where the fixed icon is used to indicate whether the widget is fixed.

Further, the receiver 1502 is further configured to receive the fix instruction triggered by the user at the fixed point, where the fixed point is any vertex of the widget, and coordinates of the fixed point are $(x_0, y_0)$; and the processor 1501 is further configured to, when the fix instruction is received, acquire coordinates $(x'_0, y'_0)$ of a reference point that is on the border of the widget and forms a diagonal line with the fixed point; subtract a horizontal coordinate of the start point of the sliding track from a horizontal coordinate of the end point of the sliding track, to obtain a lateral displacement dx; subtract a vertical coordinate of the start point of the sliding track from a vertical coordinate of the end point of the sliding track, to obtain a longitudinal displacement dy; calculate coordinates $(x'_0+dx, y'_0+dy)$ of a new reference point; and calculate a widget area determined by the coordinates $(x'_0+dx, y'_0+dy)$ of the new reference point and the coordinates $(x_0, y_0)$ of the fixed point.

The receiving unit is further configured to receive a fix instruction triggered by the user at a fixed point, where the fixed point is any vertex of the widget, and coordinates of the fixed point are $(x_0, y_0)$; and the processing unit is further configured to, when the fix instruction is received, acquire coordinates $(x_1, y_1)$ of the end point of the sliding track; and calculate a widget area determined by the coordinates $(x_1, y_1)$ of the end point of the sliding track and the coordinates $(x_0, y_0)$ of the fixed point.

By means of the widget area adjustment apparatus provided in this embodiment of the present disclosure, after a fix instruction triggered by a user, an area of a widget can be adjusted according to a displacement of a sliding track or coordinates of an end point of the sliding track. The user can acquire whether the widget is currently in a fixed state according to different patterns of a fixed icon. When the widget is in the fixed state, the user can adjust the area of the widget by performing a sliding operation in an internal region of a border of the widget.

By means of the widget area adjustment apparatus provided in this embodiment of the present disclosure, after a fix instruction triggered by a user, an area of a widget can be adjusted according to a displacement of a sliding track or coordinates of an end point of the sliding track. The user can acquire whether the widget is currently in a fixed state according to different patterns of a fixed icon. When the widget is in the fixed state, the user can adjust the area of the widget by performing a sliding operation in an internal region of a border of the widget.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

The foregoing descriptions are merely implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A widget area adjustment method for a device comprising a widget, the widget area adjustment method comprising:
   displaying, in a widget non-edit mode, a first longitudinal sliding track in the widget, wherein the first longitudinal sliding track in the widget non-edit mode selectively displays information within the widget when the first longitudinal sliding track in the widget non-edit mode is moved longitudinally;
   entering a widget edit mode for the widget according to a startup instruction triggered on the widget by a user of the device;
   acquiring, in the widget edit mode, a second longitudinal sliding track in the widget;
   switching, in the widget edit mode, the first longitudinal sliding track in the widget non-edit mode with the second longitudinal sliding track in the widget edit mode, wherein the second longitudinal sliding in the widget edit mode is displayed within an internal region of the widget and is used to adjust a widget area of the widget, and wherein the internal region comprises a region within four vertexes of the widget; and
   adjusting the widget area of the widget by selectively moving a start point of the second longitudinal sliding track in the widget edit mode to an end point of the second longitudinal sliding track in the widget edit mode.

2. The widget area adjustment method of claim 1, wherein adjusting the widget area of the widget comprises:
   determining a displacement according to the start point of the second longitudinal sliding track in the widget edit mode and the end point of the second longitudinal sliding track in the widget edit mode, wherein the displacement indicates displacements of the four vertexes of the widget;
   calculating an end position of the widget according to the displacement and a start position of the widget, wherein the start position of the widget comprises first coordinates of the four vertexes of the widget, wherein the first coordinates of the four vertexes of the widget correspond to the start point of the second longitudinal sliding track in the widget edit mode, wherein the end position of the widget comprises second coordinates of the four vertexes of the widget, and wherein the second coordinates of the four vertexes of the widget correspond to the end point of the second longitudinal sliding track in the widget edit mode;
   acquiring third coordinates of second four vertexes of a display border of a screen of the device; and
   calculating an area of an overlap region between the widget and the display border when a coordinate of a vertex of the four vertexes exceeds a coordinate range of the third coordinates of the second four vertexes of the display border, wherein the third coordinates of the second four vertexes of the display border are in the second coordinates of the four vertexes of the widget, and wherein the area of the overlap region is the widget area.

3. The widget area adjustment method of claim 1, wherein entering the widget edit mode according to the startup instruction comprises displaying the widget in an activation state according to the startup instruction.

4. The widget area adjustment method of claim 1, wherein the startup instruction is triggered by the widget being pressed for over one second.

5. The widget area adjustment method of claim 1, wherein the startup instruction is triggered by the widget being tapped.

6. The widget area adjustment method of claim 1, wherein the widget area is adjusted by calculating a displacement of the second longitudinal sliding track.

7. The widget area adjustment method of claim 1, wherein the widget runs on an ANDROID operating system of the device.

8. The widget area adjustment method of claim 1, wherein the widget displays information of an application installed on the device.

9. The widget area adjustment method of claim 1, wherein the widget comprises a news tile.

10. The widget area adjustment method of claim 1, wherein the widget comprises a mail subject.

11. The widget area adjustment method of claim 1, wherein the widget comprises a reminder.

12. The widget area adjustment method of claim 1, wherein the widget launches an application upon being tapped.

13. The widget area adjustment method of claim 1, wherein a display manner of the widget changes when the widget enters the widget edit mode.

14. The widget area adjustment method of claim 13, wherein the display manner of the widget comprises displaying a border of the widget and filling lines when the widget enters the widget edit mode.

15. An electronic device, comprising:
a memory comprising instructions; and
one or more processors coupled to the memory, wherein when the instructions are executed by the one or more processors, the electronic device is configured to:
display, in a widget non-edit mode, a first longitudinal sliding track in a widget, wherein the first longitudinal sliding track in the widget non-edit mode selectively displays information within the widget when the first longitudinal sliding track in the widget non-edit mode is moved longitudinally;
enter a widget edit mode for the widget according to a startup instruction triggered on the widget by a user of the electronic device;
acquire, in the widget edit mode, a second longitudinal sliding track in the widget;
switch, in the widget edit mode, the first longitudinal sliding track in the widget non-edit mode with the second longitudinal sliding track in the widget edit mode, wherein the second longitudinal sliding in the widget edit mode is displayed within an internal region of the widget and is used to adjust a widget area of the widget, and wherein the internal region comprises a region within four vertexes of the widget; and
adjust the widget area of the widget by selectively moving a start point of the second longitudinal sliding track in the widget edit mode to an end point of the second longitudinal sliding track in the widget edit mode.

16. The electronic device of claim 15, wherein when the instructions are executed by the one or more processors, the electronic device is further configured to:
determine a displacement according to the start point of the second longitudinal sliding track in the widget edit mode and the end point of the second longitudinal sliding track in the widget edit mode, wherein the displacement indicates displacements of the four vertexes of the widget;
calculate an end position of the widget according to the displacement and a start position of the widget, wherein the start position of the widget comprises first coordinates of the four vertexes of the widget, wherein the first coordinates of the four vertexes of the widget correspond to the start point of the second longitudinal sliding track in the widget edit mode, wherein the end position of the widget comprises second coordinates of the four vertexes of the widget, and wherein the second coordinates of the four vertexes of the widget correspond to the end point of the second longitudinal sliding track in the widget edit mode;
acquire third coordinates of second four vertexes of a display border of a screen of the device; and
calculate an area of an overlap region between the widget and the display border when a coordinate of a vertex of the four vertexes exceeds a coordinate range of the third coordinates of the second four vertexes of the display border, wherein the third coordinates of the second four vertexes of the display border are in the second coordinates of the four vertexes of the widget, and wherein the area of the overlap region is the widget area.

17. The electronic device of claim 15, wherein when the instructions are executed by the one or more processors, the electronic device is further configured to display the widget in an activation state according to the startup instruction.

18. A computer program product comprising a non-transitory computer readable storage medium storing program code thereon for widget area adjustment, wherein the program code comprises instructions for executing a method that comprises:
displaying, in a widget non-edit mode, a first longitudinal sliding track in a widget, wherein the first longitudinal sliding track in the widget non-edit mode selectively displays information within the widget when the first longitudinal sliding track in the widget non-edit mode is moved longitudinally;
entering a widget edit mode for the widget according to a startup instruction triggered on the widget by a user of a device;
acquiring, in the widget edit mode, a second longitudinal sliding track in the widget;
switching, in the widget edit mode, the first longitudinal sliding track in the widget non-edit mode with the second longitudinal sliding track in the widget edit mode, wherein the second longitudinal sliding in the widget edit mode is displayed within an internal region of the widget and is used to adjust a widget area of the widget, and wherein the internal region comprises a region within four vertexes of the widget; and
adjusting the widget area of the widget by selectively moving a start point of the second longitudinal sliding track in the widget edit mode to an end point of the second longitudinal sliding track in the widget edit mode.

19. The computer program product of claim 18, wherein adjusting the widget area of the widget comprises:
   determining a displacement according to the start point of the second longitudinal sliding track in the widget edit mode and the end point of the second longitudinal sliding track in the widget edit mode, wherein the displacement indicates displacements of the four vertexes of the widget;
   calculating an end position of the widget according to the displacement and a start position of the widget, wherein the start position of the widget comprises first coordinates of the four vertexes of the widget, wherein the first coordinates of the four vertexes of the widget correspond to the start point of the second longitudinal sliding track in the widget edit mode, wherein the end position of the widget comprises second coordinates of the four vertexes of the widget, and wherein the second coordinates of the four vertexes of the widget correspond to the end point of the second longitudinal sliding track in the widget edit mode;
   acquiring third coordinates of second four vertexes of a display border of a screen of the device; and
   calculating an area of an overlap region between the widget and the display border when a coordinate of a vertex of the four vertexes exceeds a coordinate range of the third coordinates of the second four vertexes of the display border, wherein the third coordinates of the second four vertexes of the display border are in the second coordinates of the four vertexes of the widget, and wherein the area of the overlap region is the widget area.

20. The computer program product of claim 18, wherein entering the widget edit mode according to the startup instruction comprises displaying the widget in an activation state according to the startup instruction.

\* \* \* \* \*

UNITED STATES PATENT AND TRADEMARK OFFICE
CERTIFICATE OF CORRECTION

| | | |
|---|---|---|
| PATENT NO. | : 10,901,587 B2 | Page 1 of 1 |
| APPLICATION NO. | : 16/432439 | |
| DATED | : January 26, 2021 | |
| INVENTOR(S) | : Rong Xue | |

It is certified that error appears in the above-identified patent and that said Letters Patent is hereby corrected as shown below:

On the Title Page

Page 2, Column 1, (56) References Cited, U.S. Patent Documents, Line 2:
"2003/0107604 A1 6/2003 Cording"
Should read:
"2003/0107604 A1 6/2003 Ording"

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*